March 10, 1925.
R. HUFF
SWITCH
Filed June 17, 1921
1,528,770
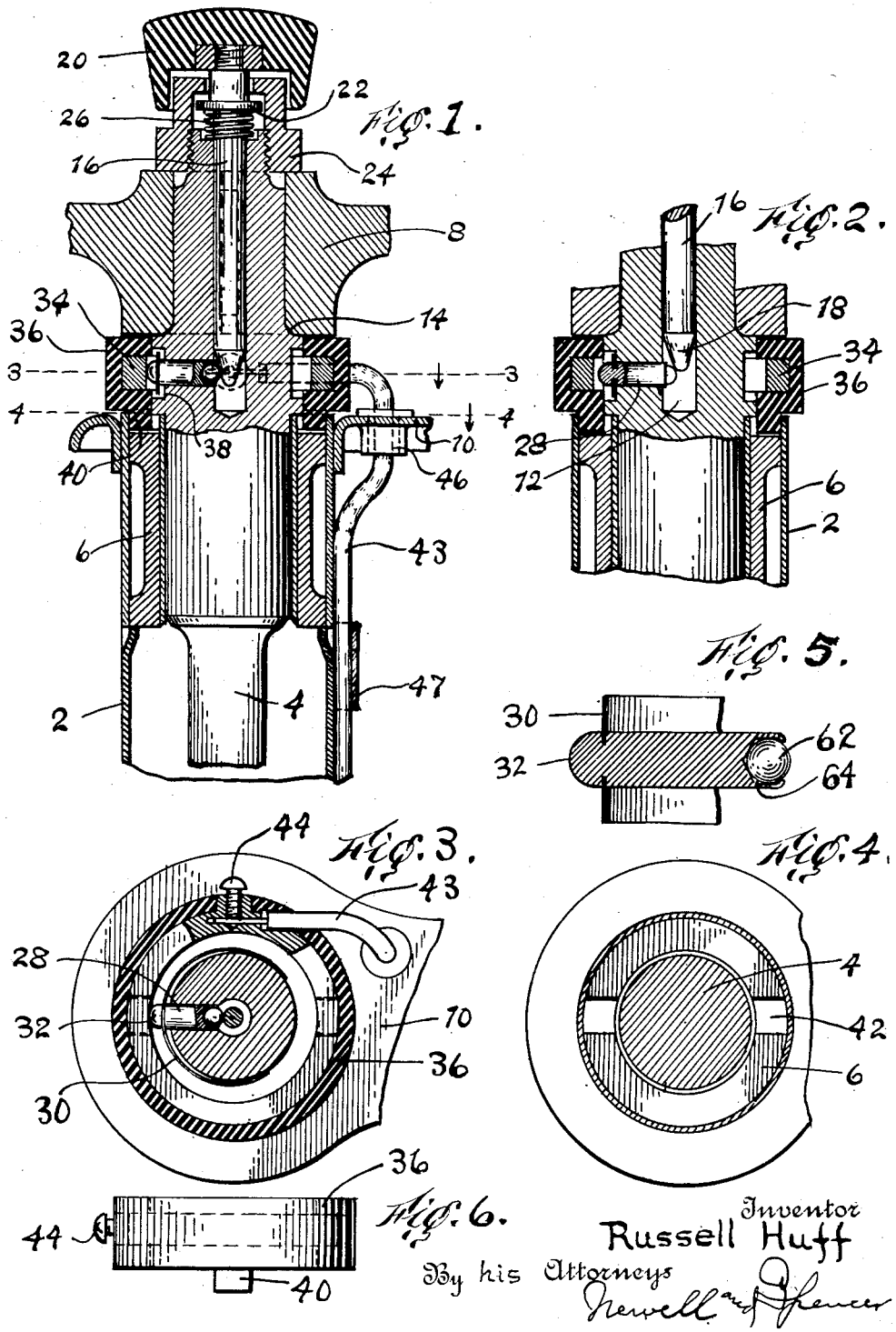
Inventor
Russell Huff
By his Attorneys
Newell and Spencer Patented Mar. 10, 1925.

1,528,770

UNITED STATES PATENT OFFICE.

RUSSELL HUFF, OF DETROIT, MICHIGAN, ASSIGNOR TO DODGE BROTHERS, OF DETROIT, MICHIGAN, A CORPORATION OF MICHIGAN.

SWITCH.

Application filed June 17, 1921. Serial No. 478,226.

*To all whom it may concern:*

Be it known that I, RUSSELL HUFF, a citizen of the United States, residing at Detroit, Michigan, have invented certain new and useful Improvements in Switches, of which the following is a clear, full, and exact description.

This invention relates to electric switches, and particularly to switches of the type adapted to be installed in motor vehicles for the operation of the horn or for similar purposes.

A particular object of the present invention is to provide a switch for location at the upper end of the steering shaft of the motor vehicle, substantially at the center of the steering wheel, which is simple, compact and durable in construction, which is so constructed and so arranged with respect to the steering shaft and steering column that it is not liable to get out of order either mechanically or electrically, and which, furthermore, is so constructed and arranged that it adds very little to the work of assembling in the chassis assembly line.

Other objects and important features of the invention will appear from the following description and claims when considered in connection with the accompanying drawings, in which—

Fig. 1 is a vertical section, party broken away, through the upper end of a steering column, steering shaft and steering wheel of a motor vehicle in which the present invention is embodied, the switch being shown in closed condition;

Fig. 2 is a detail of the section shown in Fig. 1 showing the switch in open condition;

Fig. 3 is a section on the line 3—3 of Fig. 1;

Fig. 4 is a section on the line 4—4 of Fig. 1;

Fig. 5 is an enlarged section through the radial plunger member of the switch and the attached spring, illustrating the mode of connecting the spring to the radial plunger; and Fig. 6 is a side elevation of the insulating support for the annular contact member of the switch.

In the accompanying drawings, the steering column 2, the steering shaft 4, the bearing 6 for the steering shaft in the upper end of the steering column the steering wheel 8, and the bracket 10 for the throttle and spark levers may all be of usual construction, except for the modification of the upper end of the steering shaft to receive the movable members of the switch. As herein shown, the steering shaft is provided with an axial bore 12 extending from its upper end to a point somewhat below the shoulder 14 on said shaft on which the steering wheel 8 rests, and a plunger 16 having a conical lower end 18, somewhat rounded at its apex, is arranged to move lengthwise of this bore, this plunger having at its upper end a push button 20 which may be of the usual material of which push buttons are made, and having a shoulder 22 within the hollowed portion of a nut 24 which is threaded upon the upper end of the steering shaft and adapted to clamp the steering wheel 8 upon said shaft. The shoulder 22 is normally pressed against the upper wall of the cavity within the nut 24 by a spring 26 located between said shoulder and the upper end of the steering shaft, the nut 24, therefore, serving as a stop to limit the upward movement of the plunger under the action of the spring 26.

Cooperating with the plunger 16 is a radially movable plunger 28 guided in a radial bore in the shaft 4 which communicates with the axial bore 12, this radial plunger extending through a spring 30 and being headed over upon the spring at 32 to form a contact member adapted to engage an annular contact member 34 surrounding the steering shaft 4 and embedded in an insulating support 36 by which it is insulated from the steering column and the steering shaft. As shown in Fig. 3 of the drawings, the spring 30 extends perhaps three-quarters of the way around the steering shaft 4, preferably being confined within an annular groove 38 in said shaft. This permits the plunger with the attached spring to be sprung into positiion before the annular contact member 34 and its insulating support 36 are slipped into position over the shaft.

The insulating support 36 has depending lugs 40 which enter recesses 42 in the upper end of the bearing 6, thereby holding the support 36 and the contact member 34 from turning with the shaft 4.

As above pointed out, the annular contact member 34 is insulated from the steering column and the steering shaft by its support 36 and an electrical connection is made with this contact member in the manner shown in Fig. 3, the wire 43 from the source of current supply being clamped in a socket in the contact member by a set screw 44.

In the form of the invention shown in Fig. 1 of the drawings, the wire 43 is carried down the outside of the steering column 2, being held thereon by clips 47 which may be fastened to the column in any suitable manner.

From the foregoing description the operation of the device will be readily understood. When the parts are in the position shown in Fig. 2 depression of the plunger 16 by pressure of the finger upon the button 20 at its upper end will cause its conical lower end 18 to engage the anti-friction ball 62 in the end of the radial plunger 28 and force the plunger 28 outward until its contact head 32 engages the annular contact member 34, thus grounding the circuit through the shaft and steering column.

As above pointed out, the horn or other device to be operated from the switch may have one terminal connected to the wire 43 and its other terminal connected to the battery, the other side of the battery being grounded. Grounding of the circuit in the manner just described tends, therefore, to operate the horn or other device thus connected.

It will be noted that the anti-friction ball 62 is confined in a socket 64 drilled into the end of the plunger 28, the edges of the socket being turned in to retain the ball in the socket.

What I claim as new is—

1. In a switch for use with motor vehicles, the combination with the steering shaft, of an annular contact member surrounding said shaft and insulated therefrom, means movable laterally in said shaft for engaging said contact member and means extending to the upper end of said shaft and movable lengthwise thereof for effecting the lateral movement of said first mentioned means.

2. In a switch adapted to be mounted upon the steering shaft and steering column of a motor vehicle, a plunger in the axis of the steering shaft, a second plunger coacting with said axial plunger and movable radially in said steering shaft, an annular contact member opposed to the path of swing of said radial plunger with the steering shaft, and means yieldingly holding said radial plunger out of contact with said annular member.

3. In a switch for use with motor vehicles, the combination with a steering shaft, of co-acting plungers guided respectively axially and radially in said shaft, a stationary annular contact member surrounding said shaft and opposed to the path of swing of said radial plunger, and means for yieldingly maintaining said radial plunger out of contacting relation to said annular contact member, one of said contacting parts being insulated from the steering shaft.

4. In a switch adapted to be mounted on the steering shaft and steering post of a motor vehicle, a radially movable plunger carried in said steering shaft, an annular contact member opposed to the path of swing of said radial plunger with the shaft, and means co-axial with the shaft for effecting the radial movement of said plunger into contact with said annular member.

5. In a switch adapted to be carried by the steering mechanism of a motor vehicle, the combination with a steering shaft of a plunger movable radially in said shaft, means operable from the upper end of said shaft for effecting the radial movement of said plunger, a circuit terminal insulated from said shaft and opposed to the path of swing of said radial plunger, and means for normally keeping said circuit terminal and plunger separated.

6. In a switch for use upon the steering mechanism of a motor vehicle, the combination with a steering wheel, steering shaft, steering column and a nut for holding the steering wheel upon the steering shaft, of a plunger guided axially in the steering shaft and extending through said nut and having a stop shoulder within said nut whereby the nut limits the upward movement of said plunger, a circuit terminal surrounding said shaft and insulated therefrom and means carried by said shaft and operated by the movement of said plunger longitudinally of said shaft for grounding said circuit through said shaft.

7. In a switch adapted to be mounted upon the steering shaft and steering column of a motor vehicle and centrally with respect to the steering wheel, a plunger movable in the axis of the steering shaft and adapted to extend to a point below the steering wheel, a second plunger movable radially in the steering shaft below said steering wheel, an annular contact member opposed to the path of swing of said radial plunger with the steering shaft, and an insulating support for said annular contact member located between the steering wheel and the steering column and arranged to rest upon the upper end of the steering column.

8. In a switch for use with motor vehicles, the combination with the steering shaft and the steering column, of co-acting plungers guided respectively axially and radially in said shaft, an annular contact member surrounding said shaft and opposed to the path of swing of said radial plunger, anti-friction means carried by one of said plungers for engagement with the other, and means for yieldingly maintaining said radial plunger out of engagement with said contact member.

Signed at Detroit, Mich., this 10th day of June 1921.

RUSSELL HUFF.

Witnesses:
WM. E. SHOEMAKER,
ALFRED H. KNIGHT.